June 25, 1929.  R. D. HICKOK  1,718,557
APPARATUS FOR TESTING VACUUM TUBES
Filed March 30, 1925

Inventor
Robert D. Hickok

By Brockett, Hyde, & Milburn
Attorneys

Patented June 25, 1929.

1,718,557

UNITED STATES PATENT OFFICE.

ROBERT D. HICKOK, OF CLEVELAND, OHIO.

APPARATUS FOR TESTING VACUUM TUBES.

Application filed March 30, 1925. Serial No. 19,340.

This invention relates to method and apparatus for testing vacuum tubes used for radio purposes, and particularly for determining and directly indicating certain values which vary with useful characteristics of the tube and are therefore factors of its efficiency or operating functions.

In many, if not all, of the uses to which these tubes are subjected the only useful component of the plate current is the variation therein, (and not the absolute value) produced by variations in grid voltage. Some indication of the value of this variation is obtained from the usual "amplification co-efficient", which is ordinarily expressed as the variation in plate current resulting from a volt variation in grid voltage. However, this amplification co-efficient has always been determined by the application to the grid of two different direct current voltages, thereby varying the ohmic resistance of the plate circuit observations of the accompanying difference in plate current and the necessary calculations, whereas in actual use the useful component of the plate current, to wit, variations therein, is produced by alternating, oscillating or pulsating current applied to the grid.

My invention, therefore, aims to provide a method and apparatus for producing in the tube under test and directly indicating to the observer the effect of conditions simulating or reproducing so far as possible the behaviour of the tube when in actual service, so that the results capable of record have full significance when the tube is used and, as distinguished from other indications of amplification value, are truly indicative of the practical results to be expected from tube operation under normal working conditions.

A further object of the invention is to provide method and apparatus whereby the usual and ordinary amplification co-efficient now in use in the art may be directly indicated and read without any necessity of mathematical computations, but the apparatus, by its construction, arrangement and manner of use takes into account all necessary factors in the problem and sets up for reading upon a scale the final result of the usual calculations.

Figure 1:
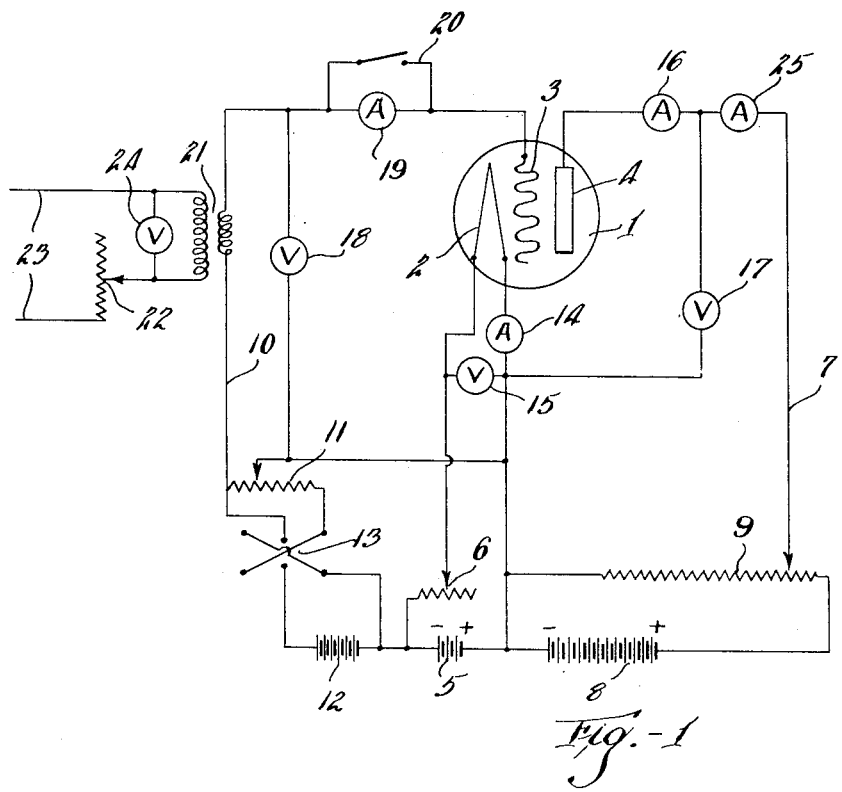
Figure 2:
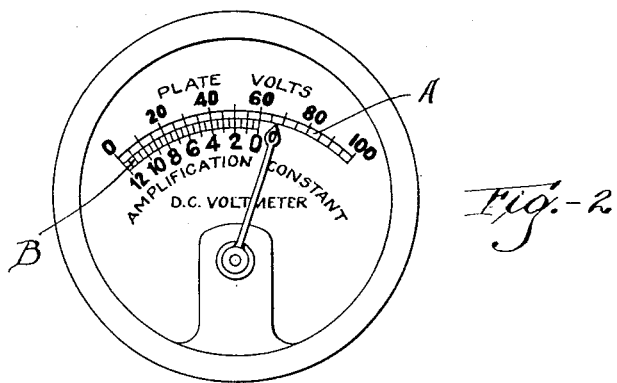

In the drawings, Fig. 1 represents a diagram of one arrangement of apparatus embodying the invention; and Fig. 2 is a front view of the scale dial portion of one of the indicating instruments.

The physical form of the apparatus is capable of wide variation. It may be built up in the laboratory by assembling in proper electrical relation with the tube all necessary instruments and circuit controlling means, but conveniently may be organized as a unitary device including the usual cabinet or casing and a panel or board upon which the tube receiving socket, the indicating instruments and the controlling devices are mounted.

For simplicity of illustration the drawings show merely a diagram, it being understood that the physical relation of the parts as well as the wiring connections thereto may be of any suitable form. In the drawings, the tube 1 to be tested is shown as an ordinary three element tube provided with a filament 2, grid 3 and plate 4, the filament being energized by an A battery 5 controlled by a rheostat 6 while the plate is in a circuit 7 through the B battery 8 controlled by a rheostat 9. The grid circuit 10 is connected to the filament circuit through a potentiometer 11 across the C battery 12, the connections to the potentiometer from the C battery including a reversing switch 13, so that either negative or positive potential may be applied to the grid.

14 and 15 respectively represent the filament ammeter and voltmeter, connected as usual to the filament circuit. 16 and 17 respectively represent the usual D. C. milliammeter and voltmeter for the plate circuit, while 18 and 19 are the usual voltmeter and micro-ammeter for the grid circuit, the latter being shunted by a switch 20 so that in the initial stages of a test the micro-ammeter 19 may be cut out for protection against a possible shorted tube.

All of these instruments are of the usual or customary form heretofore utilized in the circuits described for the purpose of testing and indicating the values or constants of an electron tube, the only exception being as to the plate voltmeter 17, which is provided with a special scale and is operated in a special manner as hereinafter described more in detail.

As before stated, in the determination of the amplification co-efficient of electron tubes, it has heretofore been the practice to apply different direct current voltages to the grid with observations of the variation in plate current produced thereby, but, of course, with the necessary assumption of maintenance of uniform plate voltage. The present apparatus is so arranged as to enable the grid to be impressed not only with the usual absolute value of direct current, either positive or negative, as desired, but to have superimposed upon or added to its direct current potential an alternating current component, such as is applied to the grid when the tube is subjected in service to the oscillating or alternating effect of the energy input, whether modulated or not. For this purpose I have connected to the grid circuit of the tube testing apparatus suitable means for supplying to the grid an alternating current effect, the means shown for the purpose comprising a suitably wound transformer 21, with its secondary in the grid circuit 10 and its primary connected through a rheostat 22 to the leads 23 of any suitable alternating current source, such as an ordinary 110 A. C. line. 24 represents an A. C. voltmeter across the primary circuit, and the transformer is so wound, proportioned and arranged as to produce a potential across its secondary equal in value to any predetermined proportion of that across its primary. In the particular instrument shown the relation is 20 to 1, so that by adjustment of the rheostat 22 until the voltmeter 24 indicates 100 volts on the primary, it will be understood that the voltage across the secondary is 5. The reduced voltage in this manner applied to the grid circuit may be of any suitable or preferred value, but in this instance an alternating current voltage of 5 has been chosen because it approximates to some degree the actual variation to which the grid circuit of a tube is subjected in use by the energy input thereto. For observing the effect of the applied alternating current upon the tube the plate circuit 7 is provided with an A. C. milliammeter 25. The apparatus is used as follows:

The application to the grid of alternating current superimposed upon the direct current results in a pulsating current in the plate circuit with current variations which, neglecting small energy losses in the tube are equal in value to the effect obtained when five volts of direct current negative potential is applied to the grid. Referring, for example to a 201A type tube, it will be found in practice that the plate current at zero potential is approximately 6 milliamperes at 60 volts and with minus 5 volts potential applied to the grid the plate current is about 2 milliamperes, with a difference of about 4 milliamperes for a variation of five volts in grid potential. Therefore, if an alternating current of five volts or if D. C. current of five volts negative is applied intermittently to the grid of such a tube the plate current should vary by about 4 milliamperes. This change in value of 4 milliamperes may be assumed to be due purely to the alternating current component, which is the only component of the plate circuit capable of amplifying signals when the tube is actually used in a radio set, for the reason that unvarying direct current flowing through the plate circuit produces no transfer of energy to the output circuit. It therefore follows that for any given alternating component applied to the grid circuit, the amplifying ability of the tube will increase with the amount of increase of the alternating component of the plate current. In the present instance, the filament current is set by manipulation of the rheostat 6 to the proper voltage value for the particular tube, as indicated by the voltmeter 15, and is maintained at such value throughout the test. The value of the plate voltage applied from the battery 8 to the plate of the tube may be set at any desired value, say 60 volts as determined by the adjustment of the rheostat 9 and the reading of the voltmeter 17. Amplification may vary at different plate voltages, so that obviously the amplification constant of the tube should be determined at approximately the mean of the plate voltages to which the tube may be subjected in service and the plate voltage should be maintained uniform throughout the test. The reversing switch 13 is now moved to that position in which negative bias is applied to the grid and by manipulation of the potentiometer 11 the grid voltage is adjusted to a value of say, minus 5, as determined by the voltmeter 18. The rheostat 22 is now adjusted until the A. C. voltmeter 24 reads 100 volts, so that exactly 5 volts of alternating current potential root mean square value are applied to the grid in addition to the minus 5 volts of direct current applied from the C battery. Therefore, the actual voltage impressed upon the grid as the result of the D. C. and A. C. components will vary between minus 0 and minus 10. The resultant A. C. component in A. C. milliamperes and also the dynamic mutual conductance will now be indicated directly on the A. C. milliammeter 25, which is an instrument designed to be affected by and to indicate only the alternating current component of the plate current.

In testing a large number of tubes of the same type, all of the D. C. indicating instruments may be set to indicate the values stated and the A. C. component in A. C. milliamperes and also the dynamic mutual conductance of each tube may be directly obtained by simply inserting it into the socket and taking the reading from the milliammeter 25.

The method and apparatus before described provide an indication depending solely upon and varying directly with the effect upon the alternating current characteristic of the plate circuit of alternating voltage effect impressed upon the grid circuit, and to that extent differ from prior systems for determining or indicating amplification. However, the present apparatus is also constructed and arranged and may be operated in a manner not only to determine, but to directly indicate, without computation, the ordinary amplification co-efficient heretofore used in the art. For this purpose the direct current plate voltmeter 17, which otherwise may be of ordinary form, is provided with a special scale or dial, shown in Fig. 1, it being understood, however, that the particular dial shown is merely illustrative and is not to be taken in any sense of limiting the invention.

Obviously, the amplification coefficient, to wit, the variation in the plate current corresponding to a change of one volt in grid voltage, will vary with variations in plate voltage or with variations in filament voltage or with variations in grid voltage. In other words, this co-efficient will be different at one definite plate voltage from what it is at another plate voltage, likewise with two different filament voltages, and likewise with two different grid voltages. For convenience, therefore, it is best to determine the co-efficient at any definite predetermined and constant values of plate and filament voltage, and over a suitable range of variation in grid voltage, so that the co-efficient obtained will not be that for a definite grid voltage, but more accurately will be the average of the co-efficient over a range of variation of grid voltage. In the example shown for purposes of illustration, I have selected a plate voltage of 60 and the filament voltage will be the particular voltage for which the tube is designed, say 5 volts for a 201A type tube. The scale for the D. C. plate voltmeter comprises two portions properly matched or related, to wit, the primary scale A calibrated and provided with the necessary indicia to directly indicate the absolute value of D. C. plate voltage. This is the usual scale of such voltmeters. However, beneath the primary scale A and in matched relation therewith is a secondary scale B reading in the contrary direction from the scale A and with its zero point at the assumed plate voltage, to wit, 60 volts in this example. It is assumed that the amplification co-efficient is to be determined and indicated over a range of 5 volts variation in grid voltage. Consequently, the two scales in value bear the relation to each other of 5 to 1, or in other words, a division on scale B is equal in value to five divisions on scale A, this relation taking care of the necessary computation to divide or apportion the total plate voltage variation throughout the range of 5 volts variation in grid voltage into the plate voltage variation for one volt variation in grid voltage. With this apparatus the amplification co-efficient is determined by procedure as follows:

The filament voltage is established at the usual voltage for the particular tube under test, say 5 volts for a 201A type tube and is so maintained throughout the test. The source of A. C. current from the leads 23 is, of course, cut off for this test, so that nothing but direct current potential is applied to the grid and plate circuits. The grid and plate circuits are connected to their respective sources of current and by proper manipulation of the reversing switch 13 a negative potential of say 5 volts is applied to the grid and a positive potential of 60 volts to the plate, as determined by the voltmeters 18, 17, respectively.

With these conditions established, the value of the direct current flowing through the plate circuit is read upon the milliammeter 16. By moving the reversing switch to its off or open position the grid voltage is now restored to zero. It will now be noted that the value of the plate current as indicated on the milliammeter 16 has changed to a higher value. This should be restored to its original value by manipulating the "B" battery rheostat 9 until the value of the plate current as indicated on the milliammeter 16 is the same as at the original reading. The amplification co-efficient may now be read directly upon the plate voltmeter 17. During this operation the pointer of the direct current voltmeter will be found to move across the scale from its original value to a lower value and this value being read upon the lower scale will be the average amplification co-efficient between zero grid volts and minus 5 grid volts, and the reading on scale B will be a value indicating the voltage variation in the plate circuit produced by 1 volt variation in the grid circuit over a range of voltage variation in the grid circuit from zero to minus 5 volts.

Obviously, any range of five volts variation in the grid circuit could be utilized for the test, such as a range from minus 7 to minus 2 or from minus 3 to plus 2 or from zero to plus 5 or the like. Also, the scale of the dial in Fig. 2 could be calibrated and arranged for variations of other value than 5 in the grid voltage, such as a range of 4 or 6, in which case the two scales A and B would bear the relation of 4 or 6 to 1, instead of 5 to 1. Equally, the experiment could be carried out with an assumed plate voltage of other than 60, such as 45, 90 or 135, and in such event the zero point on scale B would be placed opposite to the assumed plate voltage of 45, 90 or 135, as the case may be. In each of these instances however, the reading on scale B will be directly and without calculation the amplification co-efficient.

This method and apparatus provide a simple and convenient operation for not only determining and indicating directly a new value significant of the amplification power of the tube, but also determine and directly indicate the ordinary amplification co-efficient long known in the art.

What I claim is:

Apparatus for determining and directly indicating an average amplification constant of an electron tube, comprising associated grid, plate and filament circuits adapted for connection thereto of the tube to be tested, means for producing a predetermined definite variation in grid voltage, means for maintaining uniform filament voltage, means for adjusting the plate current to establish and maintain a predetermined definite plate current during different determinations, and a voltage indicator in the plate circuit having the usual primary scale of absolute voltage and having associated therewith a secondary scale with its zero point associated with the indication on the primary scale of a predetermined absolute plate voltage, the indicia of the secondary scale having values related to the values of the primary scale in proportion according to said predetermined definite variation in grid voltage.

In testimony whereof I hereby affix my signature.

ROBERT D. HICKOK.